United States Patent
Nishiuma et al.

(10) Patent No.: US 7,472,099 B2
(45) Date of Patent: Dec. 30, 2008

(54) FORECASTING APPARATUS

(75) Inventors: Norihiro Nishiuma, Tokyo (JP); Yukio Goto, Tokyo (JP); Fumio Ueda, Tokyo (JP); Hiroyuki Kumazawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 442 days.

(21) Appl. No.: 10/964,635

(22) Filed: Oct. 15, 2004

(65) Prior Publication Data

US 2005/0091176 A1 Apr. 28, 2005

(30) Foreign Application Priority Data

Oct. 24, 2003 (JP) ............................ 2003-364026

(51) Int. Cl.
*G06F 17/00* (2006.01)
*G06N 5/00* (2006.01)

(52) U.S. Cl. .............................. 706/45; 706/46; 706/14

(58) Field of Classification Search ................... 706/45, 706/47, 46, 14; 382/131; 600/410, 508, 600/509; 702/189; 324/638, 339, 309; 358/518; 704/500
See application file for complete search history.

(56) References Cited

U.S. PATENT DOCUMENTS

| | | | | |
|---|---|---|---|---|
| 4,973,111 A | * | 11/1990 | Haacke et al. ................ 324/309 |
| 5,355,088 A | * | 10/1994 | Howard, Jr. .................. 324/339 |
| 5,363,050 A | * | 11/1994 | Guo et al. .................... 324/638 |
| 6,144,873 A | * | 11/2000 | Madore et al. ............... 600/410 |
| 6,594,622 B2 | * | 7/2003 | Srivastava ................... 702/189 |
| 6,748,098 B1 | * | 6/2004 | Rosenfeld .................... 382/131 |
| 7,076,091 B2 | * | 7/2006 | Rosenfeld .................... 382/131 |
| 2003/0200097 A1 | * | 10/2003 | Brand ......................... 704/500 |
| 2003/0225668 A1 | | 12/2003 | Goto et al. |

FOREIGN PATENT DOCUMENTS

JP 2000-67362 3/2000

OTHER PUBLICATIONS

Matthew Brand, Incremental singular value decomposition of uncertain data with missing values, May 2002, Mitsubishi, 1-12.*
Gene H. Golub, Matrix Computations, 1996, The Johns Hopkins University Press, Cover, Title, Index p. 693.*

* cited by examiner

*Primary Examiner*—Joseph P Hirl
(74) *Attorney, Agent, or Firm*—Oblon, Spivak, McClelland, Maier & Neustadt, P.C.

(57) ABSTRACT

A forecasting apparatus for predicting future events includes a forecast processing data configuring section for configuring a data matrix including previously accumulated historical data and unknown forecast data, the data matrix having the unknown forecast data as missing elements, and a forecast processing section for estimating values of the missing elements representative of the unknown forecast data by performing singular value decomposition of the data matrix configured by the forecast processing data configuring section.

20 Claims, 15 Drawing Sheets

FIG. 9

VEHICLE NUMBERS →

| 0 | 0 | −10 | | |
|---|---|---|---|---|
| 10 | −10 | −10 | | MISSING DATA |
| −10 | −10 | 33 | | |
| −10 | 24 | 9 | 9 | |
| −10 | 5 | −10 | | |
| −10 | −10 | 0 | 0 | |
| 5 | 3 | 4 | 4 | |
| −10 | 4 | −10 | | MISSING DATA |
| −10 | 55 | −10 | | |
| −10 | 23 | 43 | | |
| −10 | −10 | 6 | 6 | |
| 43 | 25 | 15 | 15 | MISSING DATA |
| −10 | 9 | 71 | | |
| 25 | 60 | −10 | | |
| 13 | 3 | 6 | 6 | |
| 3 | 8 | 10 | 10 | |

41

↓ ROAD SECTION NUMBERS

FIG. 10

VEHICLE NUMBERS →

| 0 | 0 | -10 | | |
|---|---|---|---|---|
| 10 | -10 | -10 | | |
| -10 | -10 | 33 | | |
| -10 | 24 | 9 | 9 | ⎫ MISSING DATA |
| -10 | 5 | -10 | | ⎭ |
| -10 | -10 | 20 | 20 | |
| 5 | 3 | 4 | 4 | |
| -10 | 4 | -10 | | ⎫ MISSING DATA |
| -10 | 55 | -10 | | ⎭ |
| -10 | 23 | 43 | | |
| -10 | -10 | 6 | 6 | |
| 43 | 25 | 15 | 15 | ⎫ MISSING DATA |
| -10 | 9 | 71 | | ⎭ |
| 25 | 60 | -10 | | |
| 13 | 3 | 6 | 6 | |
| 3 | 8 | 10 | 10 | |

41

↓ ROAD SECTION NUMBERS

FORECASTING APPARATUS

BACKGROUND OF THE INVENTION

1. Field of the Invention

The present invention relates to a forecasting apparatus for predicting future events by using previously accumulated historical data.

2. Description of the Background Art

Generally, there exist various kinds of events of which historical data can be accumulated. These events include traffic-related phenomena, such as changes in travel time, traffic volumes or traffic jam conditions in transportation by roadways, railways, elevators, and so on, changes in total power consumption in the electric power industry, as well as changes in stock prices in the economic sector, which are expected to occur with some periodicity or reproducibility related to human activities. It is often needed to calculate forecast data from the accumulated historical data so that appropriate measures can be taken to cope with future changes.

In the sector of road traffic networks, for example, the volume and accuracy of historical data obtainable in the future are expected to significantly increase due to anticipated additional provision of various sensors, such as vehicle sensors, and introduction of probe cars.

In predicting future events, a forecasting apparatus must meet a variety of needs with respect to the intended time span of prediction, that is, how far into the future the forecasting apparatus should predict future events. In traffic-related phenomena, for example, there are cases where long-term forecasts (covering a prediction time span of a few hours to a few days) are necessary, such as when changing departure time or transport means to be used before departing. Also, there are cases where short-term forecasts (covering a prediction time span of a few seconds to a few or few tens of minutes) are necessary, such as when one is in need of route guidance after departing.

Furthermore, it is known that road traffic networks have considerably varying characteristics depending on areas (urban or local areas) and road types (ordinary roads or highways). Hence, a forecasting method which achieves a high degree of prediction accuracy in one area does not necessarily give good forecasting results in other areas. In practical applications, an optimum length of data to be accessed (or search data) for use in traffic prediction differs with areas and road types, for example. Optimum choice of historical data including kinds thereof and data from how far upstream or downstream of a particular roadway, for which a traffic forecast is to be made, should be taken into consideration in the traffic prediction also varies significantly depending on areas and road types.

Furthermore, currently unavailable data may become obtainable in the future as a result of additional provision of sensors, or currently available data may become unexploitable due to removal of unnecessary sensors, failures of particular sensors or deterioration of communication conditions. Under such circumstances, there is the need for a forecasting method which can efficiently handle and analyze a great deal of data and flexibly cope with differences in data structure and missing data values.

Japanese Laid-open Patent Application Publication No. 2000-67362 proposes a prior art forecasting method based on a pattern matching technique for predicting future events in road traffic systems, such as travel times, traffic volumes and traffic jam conditions, which are expected to occur with periodicity or reproducibility related to human activities.

FIGS. 15A and 15B are diagrams illustrating the prior art forecasting method disclosed in Japanese Laid-open Patent Application Publication No. 2000-67362.

Referring to FIG. 15A, a search data 1005 includes M number of historical data values taken from N number of time series historical data values ($M \leq N$) expressing past conditions, while a forecast data 1006 includes P number of latest data values positioned ahead of the search data 1005. A historical data pattern table 1004 shown in FIG. 15A includes latest L number of combinations of the data 1005 and the data 1006.

Referring to a flowchart of FIG. 15B, when new historical data have been obtained, a judgment is made to determine whether it is necessary to update the historical data pattern table 1004. If it is judged to be necessary to update the historical data pattern table 1004, the oldest combination of the search data 1005 and the forecast data 1006 is abandoned and a new combination of the data 1005 and 1006 is added to the historical data pattern table 1004 in step 1001.

If it is necessary to obtain forecast data for a particular event, a search key 1007 is generated by using M number of historical data values taken from N number of time series data values ($M \leq N$) expressing conditions at a point of prediction. Then, in step 1002, a search data 1005 having a pattern most resembling a pattern of the search key 1007 generated as shown above is searched from the latest historical data pattern table 1004. When the search data 1005 having the pattern most resembling the pattern of the search key 1007 has been extracted, the forecast data 1006 including P number of data values corresponding to the extracted search data 1005 is output as a current forecast data 1010 in step 1003.

The aforementioned forecasting method based on the conventional pattern matching technique proposed in Japanese Laid-open Patent Application Publication No. 2000-67362 has pending problems which are discussed below.

When obtaining the forecast data 1010, it is necessary to search through the historical data pattern table 1004 using the historical data values expressing conditions at the point of prediction as the search key 1007. Therefore, processing time needed for performing search operation increases as the amount of historical data values or historical data patterns increases.

Generally, registering multiple sets of historical data having a similar pattern in the historical data pattern table 1004 does not make any sense. Thus, measures must taken to avoid registration of multiple historical data sets having a similar pattern in the historical data pattern table 1004. For this purpose, it would be necessary to examine whether a historical data pattern similar to newly obtained historical data is already registered in the historical data pattern table 1004 and to abort updating of the historical data pattern table 1004 if a similar historical data pattern already exists in the historical data pattern table 1004, for example. As it is necessary to perform such a procedure, processing time needed for updating the historical data pattern table 1004 also increases as the amount of historical data values or historical data patterns increases.

Furthermore, it would be necessary to prepare different historical data pattern tables 1004 to cope with differences in the prediction time span, that is, how far into the future prediction should be made, in the length of search data, and in data structure such as kinds of historical data used for prediction. Also, the kinds of usable historical data may dynamically increase or decrease due to additional provision of sensors or removal of existing sensors while a forecasting apparatus is being operated. Should such a situation occur, it would be necessary to rebuild the historical data pattern tables 1004 in response to data structure changes, and this imposes a good deal of work load.

Furthermore, since the forecasting method based on the conventional pattern matching technique accumulates historical data patterns themselves in the historical data pattern table 1004, the data capacity necessary for accumulating such historical data increases with an increase in the amount of historical data values or in historical data patterns. In addition, the prior art forecasting method can not fully cope with a loss of historical data caused by failures of sensors or system maintenance.

Moreover, the prior art forecasting method is intended to give a typical forecast value from a broad point of view, such as travel time needed for a vehicle to travel a fixed road section, for instance, without directly taking into consideration driving behavior or preference of each individual vehicle. It is therefore difficult for the prior art forecasting method to satisfy such requirements as to directly use a data structure in which historical data are data on moving history of individual moving objects.

SUMMARY OF THE INVENTION

The present invention is intended to provide a solution to the aforementioned problems of the prior art. Accordingly, it is a specific object of the invention to provide a forecasting apparatus for predicting future events by using previously accumulated historical data with high data processing and storing efficiencies and great flexibility to cope with differences and changes in data structure as well as a loss or lack of historical data.

To achieve this object, a forecasting apparatus of the invention for predicting future events by using previously accumulated historical data includes a forecast processing data configuring section and a forecast processing section. The forecast processing data configuring section configures a data matrix including the previously accumulated historical data and unknown forecast data, the data matrix having the unknown forecast data as missing elements. The forecast processing section estimates values of the missing elements representative of the unknown forecast data by performing singular value decomposition of the data matrix configured by the forecast processing data configuring section, and then outputs the forecast data thus calculated.

In the forecasting apparatus of the invention which predicts future events by using previously accumulated historical data, the forecast processing data configuring section configures a data matrix including the previously accumulated historical data and unknown forecast data, the data matrix having the unknown forecast data as missing elements at first, and then the forecast processing section estimates the values of the missing elements representative of the unknown forecast data by performing singular value decomposition of the data matrix configured by the forecast processing data configuring section. The forecasting apparatus thus structured can predict the future events with high prediction accuracy and with high data processing and storing efficiencies. Also, the forecasting apparatus can predict the future events with great flexibility to cope with varying data structures and a loss or lack of historical data used for prediction.

In one feature of the invention, the historical data and the unknown forecast data constituting elements of the data matrix configured by the forecast processing data configuring section represent movements of individual moving objects. The forecasting apparatus thus structured can predict the movements of the individual moving objects taking into consideration moving characteristics thereof.

These and other objects, features and advantages of the invention will become more apparent upon reading the following detailed description along with the accompanying drawings.

BRIEF DESCRIPTION OF THE DRAWINGS

FIG. 9 is a diagram illustrating how a forecast processing data configuring section of a forecasting apparatus of a second embodiment of the invention configures a forecast processing data matrix;

FIG. 10 is a diagram illustrating how the forecast processing data configuring section of the forecasting apparatus of the second embodiment configures another forecast processing data matrix;

DESCRIPTION OF THE PREFERRED EMBODIMENTS

First Embodiment

Figure 1:
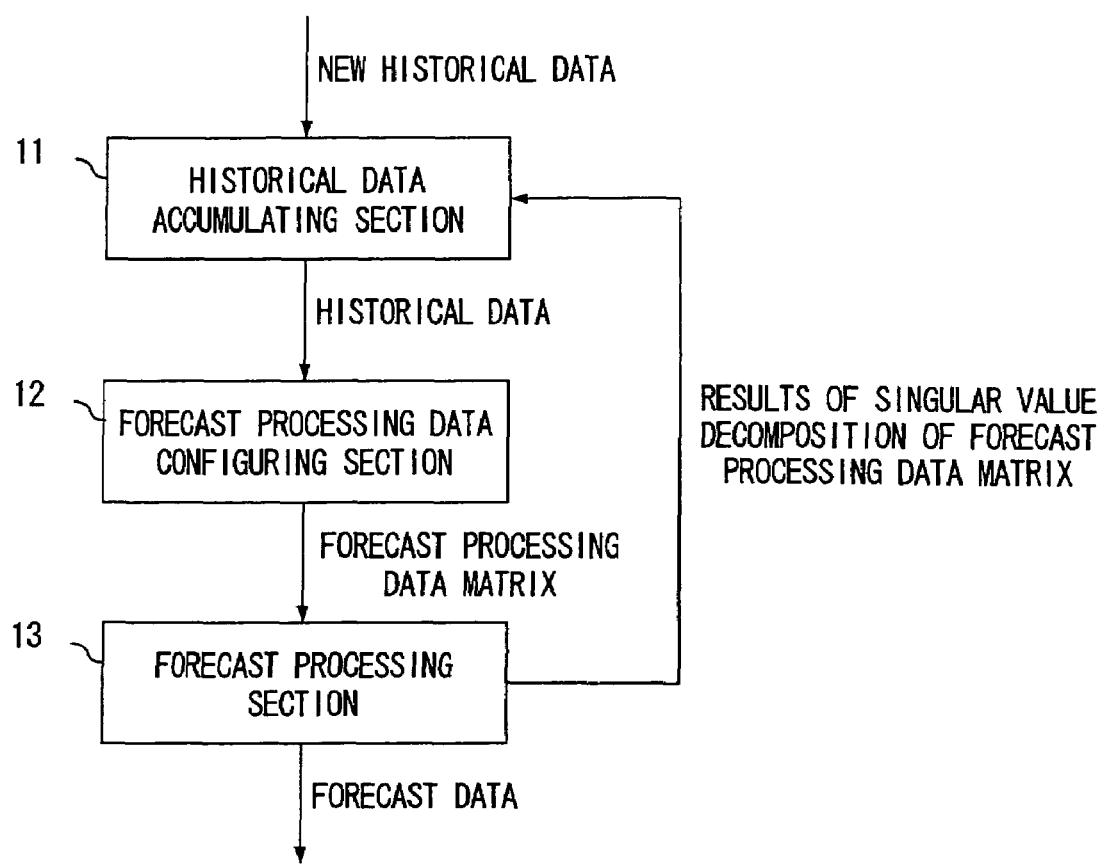
FIG. 1 is a block diagram showing the structure of a forecasting apparatus according to a first embodiment of the invention.

FIG. 1 is a block diagram showing the structure of a forecasting apparatus according to a first embodiment of the present invention.

As shown in FIG. 1, the forecasting apparatus of the embodiment includes a historical data accumulating section 11, a forecast processing data configuring section 12 and a forecast processing section 13. The historical data accumulating section 11 accumulates time-sequentially obtained historical data values in a specified format. The forecast processing data configuring section 12 configures a forecast processing data matrix 41 (see FIG. 4) needed in the forecast processing section 13 by using historical data 21 (see FIG. 2) stored in the historical data accumulating section 11. The forecast processing section 13 performs a forecast operation by way of singular value decomposition (see FIG. 5) using the forecast processing data matrix 41 configured by the forecast processing data configuring section 12 and calculates necessary data as forecast data 23.

Figure 2:
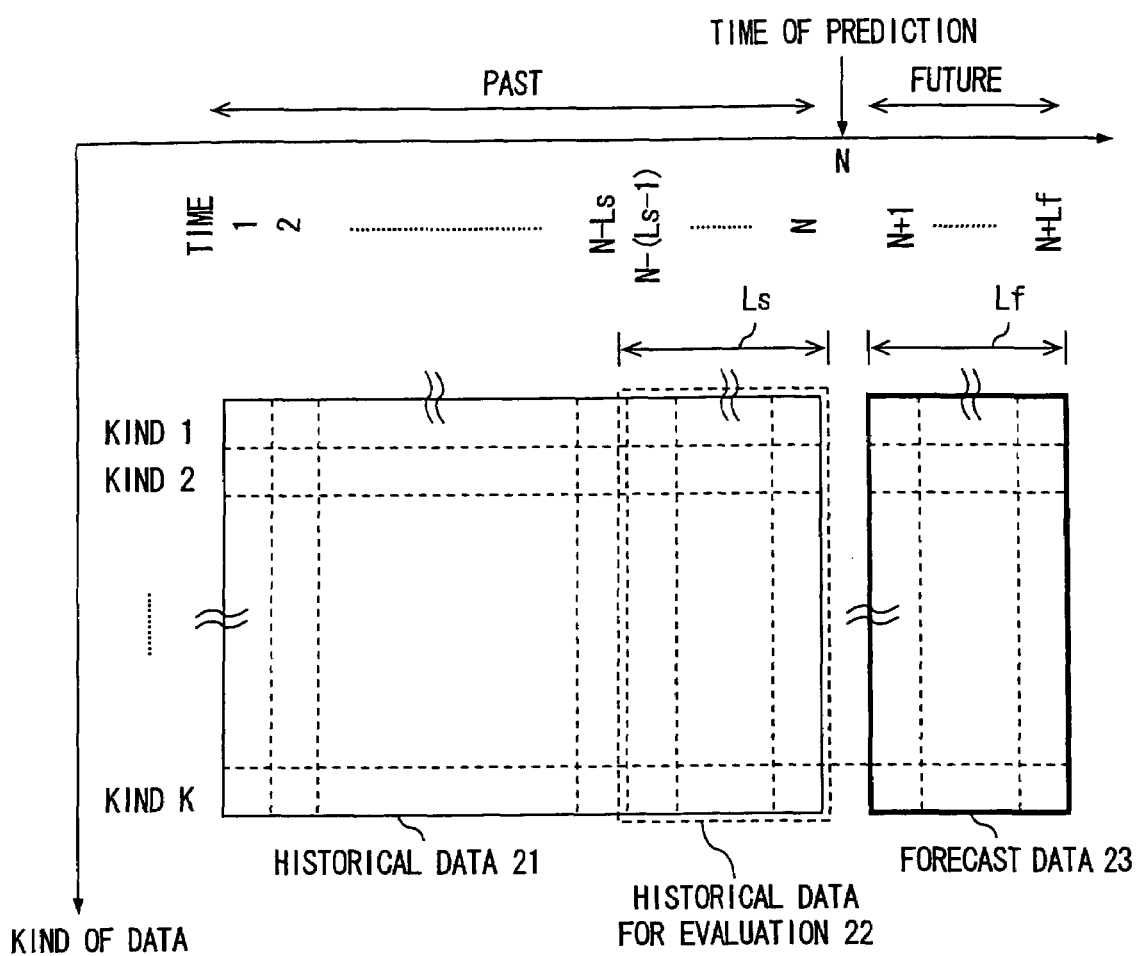
FIG. 2 is an explanatory diagram showing how historical data are stored in a historical data accumulating section of the forecasting apparatus of the first embodiment.

FIG. 2 is an explanatory diagram showing an example of the structure of data stored in the historical data accumulating section 11, in which the vertical axis represents kinds of data and the horizontal axis represents time. In the first embodiment, the forecast processing section 13 outputs the forecast data 23 for a time range from time N+1 to time N+Lf based on the historical data 21 obtained before a point in time N as will be later discussed in further detail.

Figure 3A:
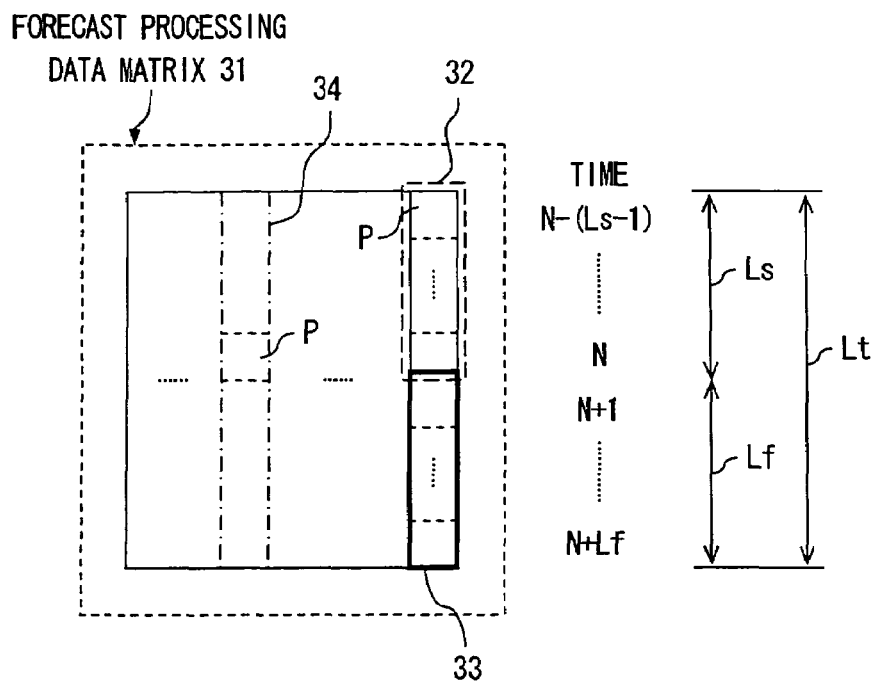
FIGS. 3A and 3B are diagrams illustrating how a forecast processing data configuring section configures a forecast processing data matrix for a single kind of historical data in the forecasting apparatus of the first embodiment.
Figure 3B:
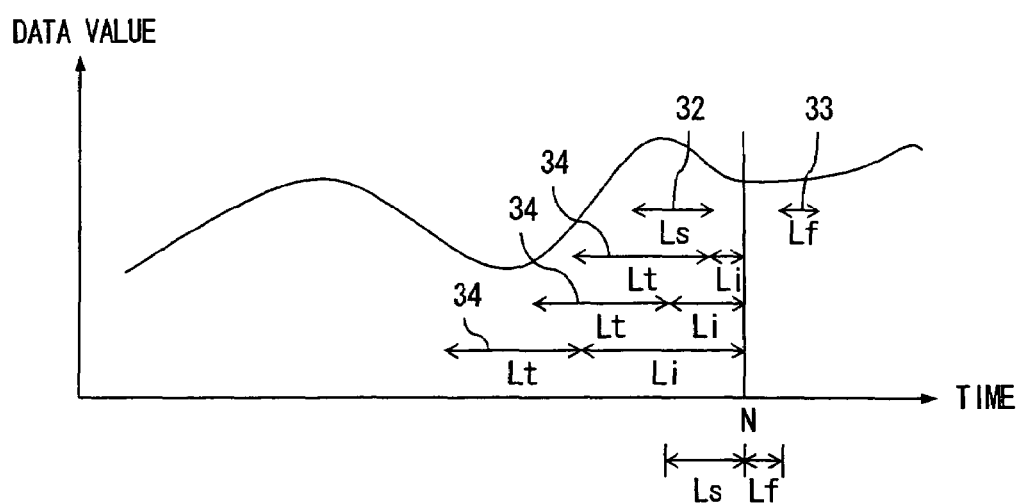
Figure 4:
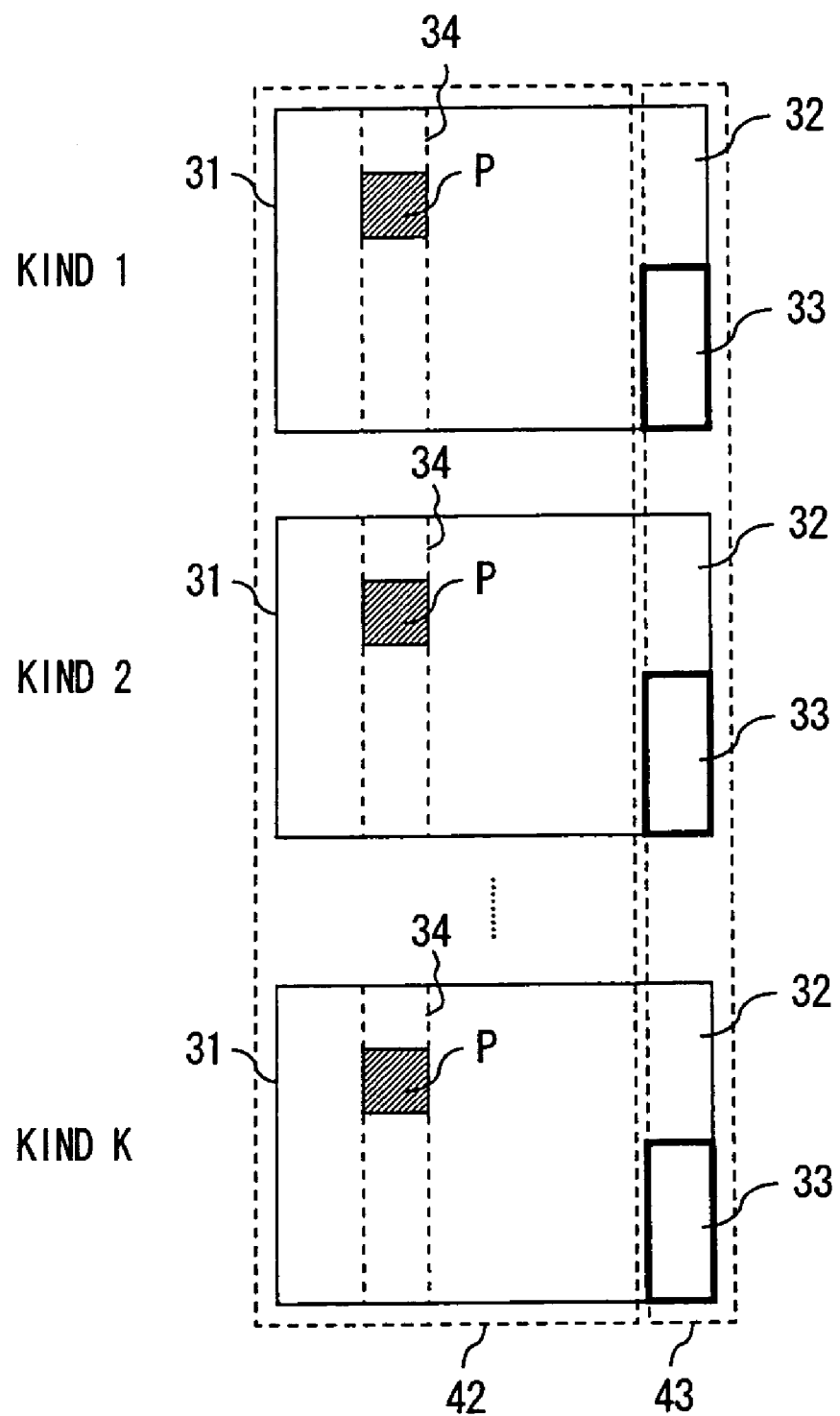
FIG. 4 is a diagram illustrating how the forecast processing data configuring section of the forecasting apparatus of the first embodiment configures a forecast processing data matrix including forecast processing data matrices for all kinds of historical data.

Explained next with reference to FIGS. 3A, 3B and 4 is how the forecast processing data configuring section 12 configures the forecast processing data matrix 41 based on the historical data 21 accumulated in the historical data accumulating section 11.

FIGS. 3A and 3B illustrate an example of how the forecast processing data configuring section 12 configures a forecast processing data matrix 31 for a single kind of historical data shown in FIG. 2. FIG. 4 illustrates an example of how the forecast processing data configuring section 12 configures the forecast processing data matrix 41 including forecast processing data matrices 31 for all kinds of historical data.

Referring to FIG. 2, the assumption is made that conditions of a time series data generating object at the point in time N and the behavior of the forecast data 23 during a future time period Lf are represented by data obtained during a time period Ls from time N-(Ls-1) to time N. The data obtained during the time period Ls is hereinafter referred to as historical data for evaluation 22. Based on this assumption, the time period Ls of the historical data for evaluation 22 is properly determined from the past historical data 21.

Explained next is how the forecast processing data configuring section 12 configures the forecast processing data matrix 31 for one specific kind of historical data. From historical data values arranged in the order of time sequence for the same kind of data, the forecast processing data configuring section 12 takes historical data for evaluation 32 within the time period Ls and forecast data 33 within the time period Lf and combines these data 32, 33 to produce a vector having a length Lt (=Ls+Lf) as shown in FIG. 3A. Since the forecast data 33 to be calculated are unknown at the current point in time, the forecast data 33 are treated as missing elements. Then, data values arranged in the order of time sequence are taken from historical data values accumulated before the time N to structure a historical data vector 34 corresponding to the length Lt (=Ls+Lf).

The vector having the length Lt including the historical data for evaluation 32 and the forecast data 33 and a plurality of historical data vectors 34, for example, having the length Lt are produced in the aforementioned manner and arranged in multiple columns to configure a forecast processing data matrix 31 for one specific kind of historical data. Multiple forecast processing data matrices 31 may be configured in a similar fashion for other kinds of historical data.

While the historical data for evaluation 32 and the forecast data 33 are taken from a continued time span from the time N-(Ls-1) to the time N+Lf in the aforementioned discussion, it is not essential to use time-sequentially stored data. As an example, the historical data for evaluation 32 may be taken from any data accumulated earlier than the time N as long as the time period during which the data was accumulated is Ls as shown in FIG. 3B. Also, the forecast data 33 may be taken from any data accumulated after the time N+1 as long as the time period during which the data was accumulated is N+1. Furthermore, the historical data vector 34 need not necessarily be derived from time-sequentially stored data as long as the time period during which the data was accumulated is Lt (=Ls+Lf), but the data for structuring the historical data vector 34 may be taken from any time period Li earlier than the time N as shown in FIG. 3B. It is to be noted, however, that times of individual data elements P of any forecast processing data matrix 31 for one kind of historical data must match times of individual data elements P of the forecast processing data matrices 31 for the other kinds of historical data.

The forecast processing data matrix 41 is structured by combining the forecast processing data matrices 31 configured as explained above for different kinds of historical data to form a vertical column as shown in FIG. 4, for example. As the forecast processing data matrix 41 is structured in the aforementioned manner, the forecast processing data matrix 41 is divided into two regions, that is, a data matrix 42 including only the historical data and a data matrix 43 including the historical data for evaluation 32 and the forecast data 33.

Figure 5:
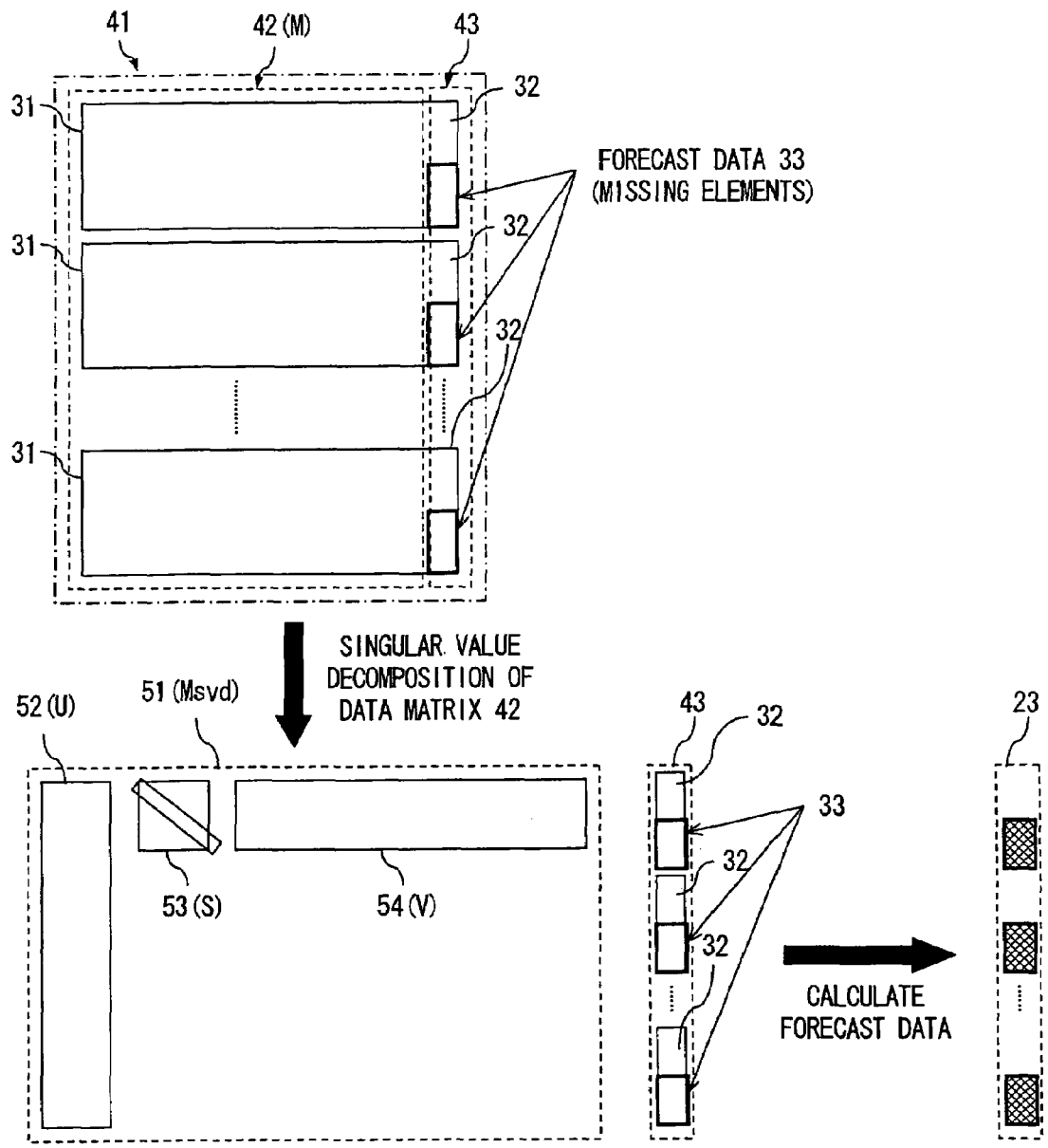
FIG. 5 is an explanatory diagram showing how a forecast processing section performs a forecast operation procedure for calculating forecast data by way of singular value decomposition based on forecast processing data matrices configured for all kinds of historical data by the forecast processing data configuring section in the forecasting apparatus of the first embodiment.

Referring now to FIG. 5, the forecast operation performed by the forecast processing section 13 is described in detail. First, the forecast processing section 13 performs singular value decomposition of the data matrix 42 (M) in the region containing only the historical data within the forecast processing data matrix 41 to obtain a matrix 51 (Msvd) after the singular value decomposition. The result of this singular value decomposition corresponds to what would be obtained when data compression is performed on the data matrix 42 (M) in the region containing only the historical data without modifying data distribution pattern characteristics of the data matrix 42 (M). Therefore, the volume of data of the matrix 51 (Msvd) obtained as a result of the singular value decomposition is significantly reduced from the volume of data of the data matrix 42 (M) before application of the singular value decomposition.

The matrix 51 (Msvd) obtained by the singular value decomposition is expressed by a product of matrices 52 (U), 54 (V) representing bases of components of the data matrix 42 (M) in the region containing only the historical data and a square matrix 53 (S) having non-zero singular values of the data matrix 42 (M) in the region containing only the historical data as diagonal elements. Thus, $$Msvd = U \cdot S \cdot V' \qquad (1)$$

where V' is a transposed matrix of the matrix V. Here, the number of rows or columns of the aforementioned square matrix 53 (S) represents the rank of the data matrix 42 (M) containing only the historical data, or the number of independent historical data patterns.

In a case where the historical data 21 do not contain any missing data values, it is possible to apply a general singular value decomposition algorithm with respect to matrices having no missing data values shown in the paper titled "Matrix Computations" written by G. Golub and A. van Loan, Johns Hopkins University Press, 1996, for example.

If the historical data 21 contain any missing data values, on the other hand, the missing data values can be filled by using an algorithm for complementing unknown data values in a matrix shown in the paper titled "Incremental Singular Value Decomposition of Uncertain Data" written by Matthew Brand in the Proceedings of European Conference on Computer Vision, Lecture Notes on Computer Science, pages 707-720, Springer-Verlag, 2002, for example. By using this unknown data complementing algorithm, it is possible to fill the missing data values in such a manner that the rank of the data matrix 42 (M) (or the number of rows or columns of the square matrix 53 (S)) containing only the historical data of which missing data values have been filled becomes the smallest. Alternatively, the missing data values may be made up for by approximating with average values of already obtained other data values, for example.

Next, using the matrix 51 (Msvd) obtained as a result of the singular value decomposition and the data matrix 43 including the forecast data 33, the forecast processing section 13 calculates specific values of the forecast data 33 which are shown as missing elements in the data matrix 43. As an example, it is possible to calculate specific values of the forecast data 33 shown as missing elements in the data matrix 43 by the same technique as used for filling the missing data values in the data matrix 42 (M) by using the unknown data complementing algorithm shown in the aforementioned paper titled "Incremental Singular Value Decomposition of Uncertain Data." Upon calculating specific values of the forecast data 33 shown as missing elements in the data matrix 43, the forecast processing section 13 finally outputs these specific values as the forecast data 23.

As thus far described, the forecast data 33 within the forecast processing data matrix 41 can be directly calculated as the specific values of the forecast data 23 at last by using the matrix 51 (Msvd) obtained as a result of the singular value decomposition of the data matrix 42 (M) containing only the historical data and the historical data for evaluation 32 in the data matrix 43 including the forecast data 33. It will therefore be appreciated that the forecasting apparatus of the first embodiment offers an extremely high computational efficiency.

Furthermore, the forecast data 23 is calculated in such a way that the number of rows or columns of the square matrix 53 (S) of singular value decompositions of equation (1) above becomes the smallest when the data matrix 42 (M) containing only the historical data is subjected to the singular value decomposition process for calculating the forecast data 23. In addition, information on the historical data necessary for calculating the forecast data 23 is stored in a compressed form as a result of the singular value decomposition. Therefore, the volume of data for storing the matrix 51 (Msvd) obtained by the singular value decomposition of the historical data to be stored for performing the forecast operation is greatly reduced in the forecasting apparatus of the first embodiment, compared to a case where the original historical data matrix 42 (M) itself is stored.

The aforementioned first embodiment can be modified or adapted in various ways. Shown below are examples of such variations of the first embodiment.

Figure 6:
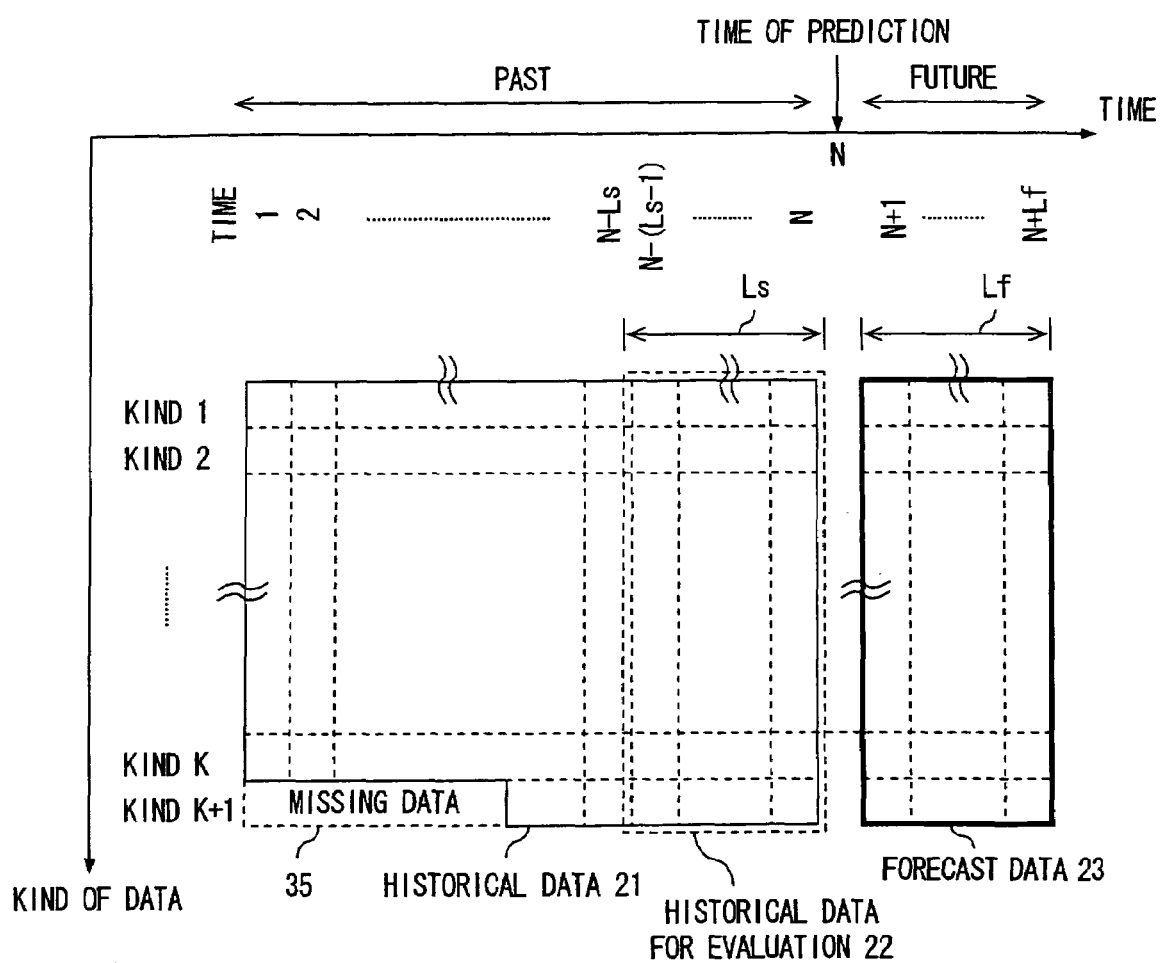
FIG. 6 is an explanatory diagram showing how the historical data accumulating section of the forecasting apparatus of the first embodiment stores historical data when the kinds of data values in the historical data increased at a particular point in time in the past.

FIG. 6 is a diagram showing a situation in which the kinds of data values in the historical data 21 increased at a particular point in time in the past. More specifically, shown in FIG. 6 is a case where data values of a kind K+1 became exploitable due to installation of new sensors, for example.

Figure 7:
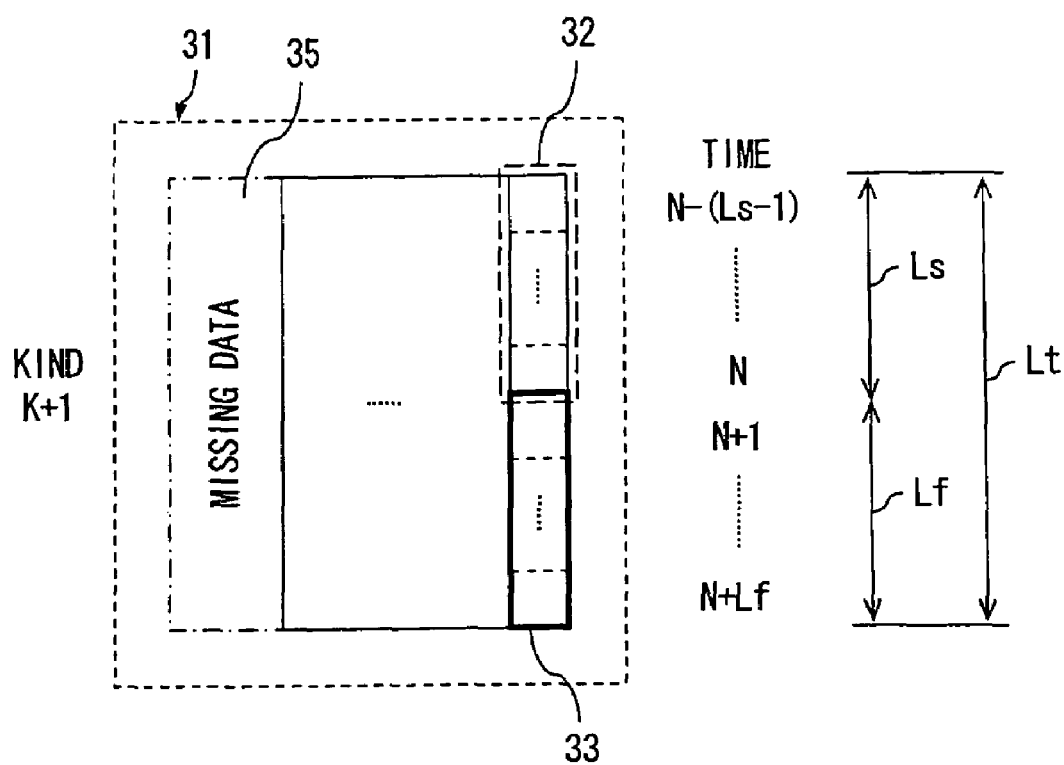
FIG. 7 is a diagram illustrating how the forecast processing data configuring section of the forecasting apparatus of the first embodiment configures a forecast processing data matrix for an additional kind of historical data when the kinds of data values in the historical data increased at a particular point in time in the past.
Figure 8:
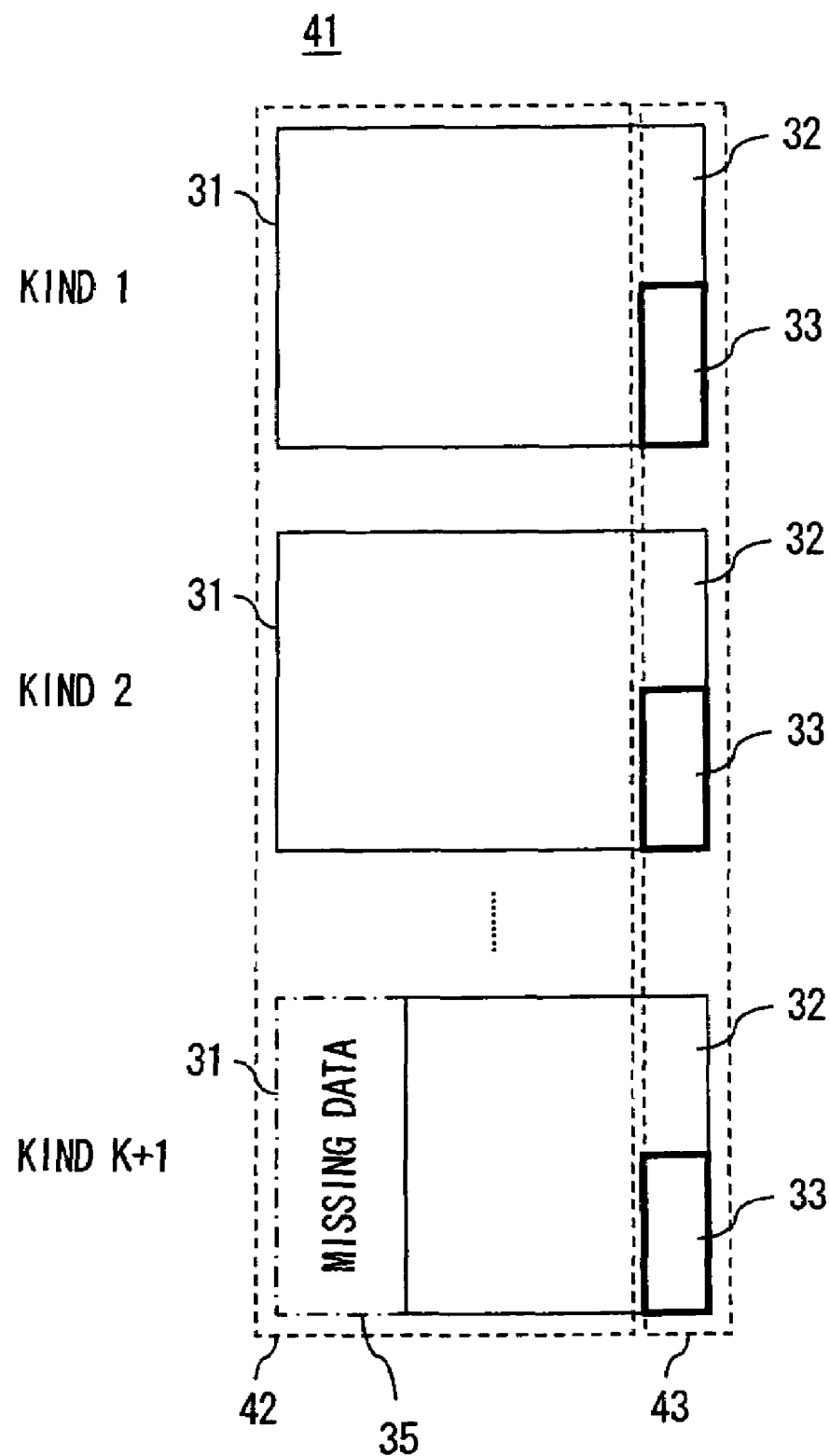
FIG. 8 is a diagram illustrating how the forecast processing data configuring section of the forecasting apparatus of the first embodiment configures a forecast processing data matrix including forecast processing data matrices for all kinds of historical data when the kinds of data values in the historical data increased at a particular point in time in the past.

FIG. 7 illustrates an example of how the forecast processing data configuring section 12 configures a forecast processing data matrix 31 for the additional kind K+1 of historical data of FIG. 6, and FIG. 8 illustrates an example of how the forecast processing data configuring section 12 configures the forecast processing data matrix 41 including forecast processing data matrices 31 for all kinds of historical data.

When configuring the forecast processing data matrix 31 for the additional kind K+1 of historical data, the forecast processing data configuring section 12 takes data values arranged in the order of time sequence from historical data values accumulated before the time N to structure a vector having an arbitrary length Lt (=Ls+Lf), wherein data values accumulated before the kinds of exploitable data values increased are set as missing elements 35 (FIG. 7).

As the data values accumulated before the kinds of exploitable data values increased are treated as the missing elements 35, it is possible to fill missing data values by using the unknown data complementing algorithm shown in the aforementioned paper titled "Incremental Singular Value Decomposition of Uncertain Data" in the same manner as the forecast processing data configuring section 12 handles the missing data values. In this way, the missing data values are complemented based on information on the historical data other than the missing data values in the historical data matrix 42 (M) (FIG. 8).

While the historical data values are directly stored time-sequentially in the historical data accumulating section 11 as shown in FIG. 2 in the above-described first embodiment, the invention is not limited to this arrangement. As an alternative, the embodiment may be modified such that the forecast processing section 13 feeds back the matrix 51 (Msvd) obtained as a result of the singular value decomposition to the historical data accumulating section 11, the matrix 51 (Msvd) thus fed back is stored in the historical data accumulating section 11 and the original historical data 21 themselves are abandoned.

More specifically, when new historical data have been obtained for the individual kinds of historical data while the matrix 51 (Msvd) obtained by the singular value decomposition of the historical data is being stored in the historical data accumulating section 11, the forecast data 23 are calculated from combinations of the newly obtained historical data, the matrix 51 (Msvd) obtained by the singular value decomposition and the data matrix 43 including the forecast data 33 output as the forecast processing data matrix 41 to the forecast processing section 13.

This approach makes it possible to calculate the forecast data 23 by using a method of efficiently calculating singular value decompositions of a matrix produced by adding a new column or row to the matrix 51 (Msvd) of which singular value decompositions are already obtained shown in the paper titled "Incremental Singular Value Decomposition of Uncertain Data." According to this method, it is not necessary to perform again singular value decomposition of the data matrix 42 (M) containing only the historical data even when new historical data have been added, but the forecast data 23 can be calculated by using the matrix 51 (Msvd) obtained by the singular value decomposition in a preceding forecast operation. It is therefore possible to achieve an extremely high computational efficiency.

To cope with changes in characteristics (e.g., construction of a new road or expansion of an existing road) of a system of which behaviors are to be predicted, it is necessary to abandon old historical data. When such a change in the system characteristics has taken place, the forecast operation may be performed after deleting old historical data from the data matrix 42 (M) containing only the historical data. Alternatively, dependency on the old historical data may be reduced by periodically multiplying the square matrix 53 (S) having singular values as diagonal elements by a positive number smaller than 1 to cope with changes in the system characteristics.

While the matrix 51 (Msvd) is obtained by precise singular value decomposition of the data matrix 42 (M) containing only the historical data in the aforementioned equation (1), an approximation technique may be used for calculating the forecast data 23. Specifically, the forecast data 23 may be calculated by using a matrix Msvd2 formed of low-dimensional components. More specifically, the low-dimensional matrix Msvd2 can be obtained from equation (2) below by using a square matrix S2 formed by taking r number of largest singular values of the square matrix 53 (S) having singular values as diagonal elements as well as matrices U2 (<U) and V2 (<V) having elements corresponding to the elements of the square matrix S2:

$$Msvd2 = U2 \cdot S2 \cdot V2' \quad (2)$$

where V2' is a transposed matrix of the matrix V2.

This approximation approach is advantageous in that the volume of data to be stored can be further reduced considerably compared to the case of using the precise singular value decompositions Msvd and that noise components can be removed in a case where the historical data are contaminated by insignificant signal components such as noise.

While the foregoing first embodiment has been discussed as using the unknown data complementing algorithm shown in the paper titled "Incremental Singular Value Decomposition of Uncertain Data," the invention is not limited to this approach. For example, the forecast data 23 can be calculated by temporarily substituting 0 or a provisional numerical value such as the average of non-missing elements in the forecast data 33 which are shown as missing elements within the forecast processing data matrix 41, applying a generally known singular value decomposition algorithm which is intended for use on a matrix having no missing data, and reducing the dimensionality of the result of the singular value decomposition algorithm.

Also, while the foregoing discussion of the first embodiment has illustrated a method in which the forecast processing data configuring section 12 arranges the vector having the length Lt including the historical data for evaluation 32 and the forecast data 33 and the historical data vectors 34 having the length Lt in columns, the forecast processing data matrices 31 (41) may be structured by arranging the vector having the length Lt including the historical data for evaluation 32 and the forecast data 33 and the historical data vectors 34 having the length Lt in rows.

Also, while the foregoing discussion of the first embodiment has illustrated a method in which the forecast processing data configuring section 12 configures the forecast processing data matrices 31 for the individual kinds of historical data, the forecast processing data matrices 31 (41) may be structured for individual times when the data are obtained.

The forecasting apparatus of the first embodiment, when applied to a road traffic system, would be able to achieve improved prediction accuracy if the forecast processing data configuring section 12 configures the forecast processing data matrix 41 taking into account not only traffic volumes and travel times but also such kinds of historical data as parking lot occupancy information including specific numbers of parked vehicles in individual parking lots, weather information, day-of-the-week information, and event information. In this case, weather information historical data can be configured by using coded weather patterns, such as clear weather=1.0, cloudy weather=0.5, and rainy weather=0.0, for example. Also, day-of-the-week information historical data can be configured by using coded data, such as Sunday=0, Monday=1, . . . , Saturday=6, holiday=7, for example.

In a case where individual kinds of historical data to be handled have different units, the result of prediction can be adjusted by altering the relative magnitude of the individual historical data. When producing the forecast processing data matrix 41, an average value may be subtracted from all values of the historical data 21 so that the individual kinds of historical data have the same variance, for example.

The foregoing discussion of the first embodiment has illustrated a general example in which the forecast processing data configuring section 12 configures the forecast processing data matrix 41 by combining vectors using data accumulated within the time period Lt (=Ls+Lf). When the forecasting apparatus of the embodiment is applied to the prediction of time series events occurring as part of social phenomena or human activities, such as traffic volumes carried by roadways, the volume of railway passengers, elevator waiting times, the amount of electric power consumption, or traffic volumes handled by a communications network, the time period Lt is set to one day (24 hours) and the forecast processing data configuring section 12 configures the forecast processing data matrix 41 by taking time-sequentially arranged data values for one-day time period from times before the time N of the historical data 21 corresponding to the same times as the times in the historical data for evaluation 22 for the time period Ls and in the forecast data 23 for the time period Lf. This approach makes it possible to obtain forecast data for the time N and later times (e.g., 7 o'clock and later times) by using time series data values of a past day similar to the historical data obtained before the time N (e.g., before 7 o'clock).

In a case where the forecasting apparatus of the embodiment is applied to the prediction of events in time series data recurring at short intervals, such as the prediction of anomalies in a control system, or to the prediction of events in time series data recurring at long intervals, such as the prediction of changes in stock prices due to business fluctuations, the time period Ls of historical data for evaluation and the time period Lf of forecast data should be properly set in accordance with the recurring intervals of the expected events in the time series data to be predicted.

Furthermore, while the unknown forecast data 33 are set as missing elements in the forecast processing data matrix 41 in the foregoing first embodiment, the prediction accuracy can be further improved if such information as day-of-the-week information or weather forecast information of which future events are known with a certain level of accuracy beforehand is set as known forecast data, and not as missing elements, in the forecast processing data matrix 41.

Second Embodiment

While a forecasting apparatus according to a second embodiment of the invention described below has basically the same structure as the forecasting apparatus of the first embodiment shown in FIG. 1, the forecast processing data configuring section 12 of the second embodiment configures a forecast processing data matrix 41 in a way different from the first embodiment.

FIG. 9 illustrates an example of how the forecast processing data configuring section 12 configures the forecast processing data matrix 41 in a case where moving objects move in a space where various sensors are installed. More specifically, shown in FIG. 9 is the forecast processing data matrix 41 produced when vehicles run on roads along which vehicle sensors and communications devices, etc. are installed. In this forecast processing data matrix 41, rows correspond to individual observation points where the vehicle sensors and communications devices, etc. are installed while columns correspond to individual vehicles. The individual observation points and vehicles are identified by observation point numbers and vehicle numbers, respectively. The forecast processing data configuring section 12 enters times at which each vehicle passes the individual observation points or numbers indicating in which order each vehicle passes the individual observation points as elements in the forecast processing data matrix 41.

The columns of the forecast processing data matrix 41 thus produced corresponding to the individual vehicle numbers indicate traveling route patterns of the individual vehicles passing specific observation points. If a particular vehicle is currently traveling, observation points and route which will be passed by that vehicle as well as times at which the vehicle will pass those observation points are unknown at present. Unknown data values of the currently traveling vehicle are set as missing data in the forecast processing data matrix 41. If a particular vehicle did not pass a particular observation point or if it is known beforehand that the vehicle will not pass a particular observation point in the future, the forecast processing data configuring section 12 fills a negative value "−10", for example, for those observation points for the pertinent vehicle in the forecast processing data matrix 41. This makes it possible to easily distinguish data obtained at observation points passed by each vehicle from data for observation points which have not been passed.

If the forecast processing section 13 performs a forecast operation by filling missing data values in the forecast processing data matrix 41 in the same way as in the first embodiment, it is possible to predict a future traveling route of a particular vehicle from a similar traveling pattern determined based on previously accumulated traveling route patterns and historical data of the same vehicle. If the vehicle having the vehicle number corresponding to the rightmost column of the forecast processing data matrix 41 of FIG. 9, for example, is currently traveling, times at which and the order in which the vehicle will pass any observation points in the future are unknown, so that the rightmost column includes missing data. It is noticed from FIG. 9 that the traveling route pattern of the vehicle corresponding to the rightmost column is similar to the previously obtained traveling route pattern of the vehicle having the vehicle number corresponding to the third column from left. Thus, it is possible to predict the future traveling route of the vehicle of the rightmost column from the past traveling route of the vehicle of the third column.

FIG. 10 illustrates how the forecast processing data configuring section 12 configures another form of the forecast processing data matrix 41 of which rows correspond to individual sections of specific roads while columns correspond to individual vehicles driven by drivers thereof. The individual road sections and vehicles are identified by road section numbers and vehicle numbers, respectively. The forecast processing data configuring section 12 enters travel times needed by the individual vehicles to travel the individual road sections as elements in the forecast processing data matrix 41.

The columns of the forecast processing data matrix 41 thus produced corresponding to the individual vehicle numbers indicate patterns of past travel times needed by the drivers of the individual vehicles to travel specific road sections. If a particular vehicle is currently traveling, road sections which will be traveled by that vehicle are unknown at present. Unknown data values of the currently traveling vehicle are set as missing data in the forecast processing data matrix 41. If a particular vehicle did not travel a particular road section or if it is known beforehand that the vehicle will not travel a particular road section the forecast processing data configuring section 12 fills a negative value "−10", for example, for those road sections for the pertinent vehicle in the forecast processing data matrix 41. This makes it possible to easily distinguish data obtained for road sections traveled by each vehicle from data for road sections which have not been traveled.

If the forecast processing section 13 performs a forecast operation by filling missing data values in the forecast processing data matrix 41 in the same way as in the first embodiment, it is possible to predict a future travel time required by a particular vehicle to travel a specific road section from a similar travel time pattern determined based on previously accumulated travel time patterns and historical data of the same vehicle. If the vehicle having the vehicle number corresponding to the rightmost column of the forecast processing data matrix 41 of FIG. 10, for example, is currently traveling, travel times needed by the vehicle to travel road sections which will be chosen in the future are unknown, so that the rightmost column includes missing data. It is noticed from FIG. 10 that the travel time pattern of the vehicle corresponding to the rightmost column is similar to the previously obtained travel time pattern of the vehicle having the vehicle number corresponding to the third column from left. Thus, it is possible to predict travel times needed by the vehicle of the rightmost column to travel the road sections which will be chosen in the future. The forecast operation performed in the aforementioned manner reflects driving behaviors of the individual drivers. More specifically, the forecasting apparatus of the present embodiment makes it possible to predict travel times of the desired road sections required by a specific driver, whether the driver usually drives fast or slowly.

While the second embodiment has been discussed in relation to vehicles, the embodiment is also applicable to the prediction of motions of other moving objects, such as pedestrians.

Third Embodiment

Figure 11:
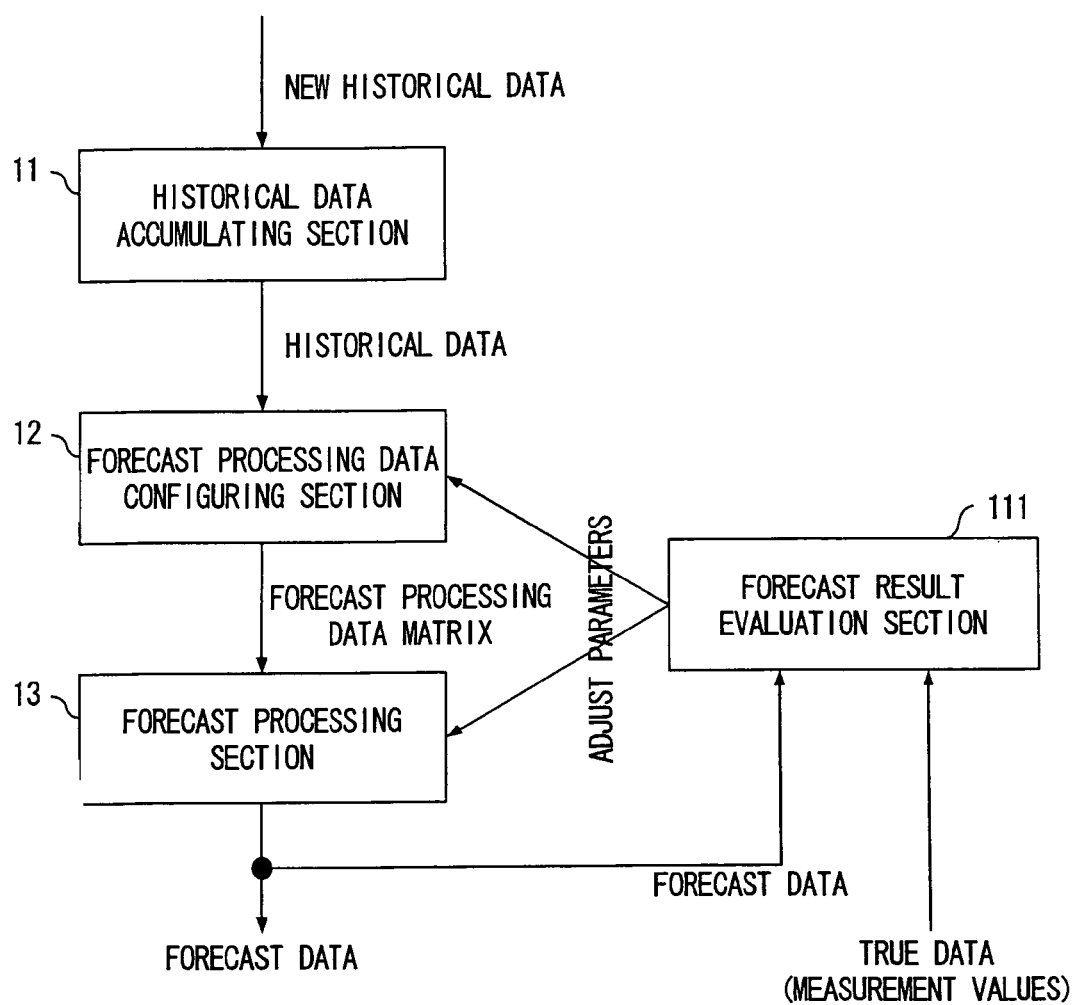
FIG. 11 is a block diagram showing the structure of a forecasting apparatus according to a third embodiment of the invention.

FIG. 11 is a block diagram showing the structure of a forecasting apparatus according to a third embodiment of the present invention, in which elements corresponding to those of the first embodiment shown in FIG. 1 are designated by the same reference numerals.

What is characteristic of the third embodiment as compared to the structure of first embodiment is that the forecasting apparatus further includes a forecast result evaluation section 111 for altering parameters of the forecast processing data configuring section 12 and/or the forecast processing section 13 in accordance with results of a forecast operation performed by the forecast processing section 13.

When true data have been obtained from actual measurement values corresponding to forecast data output from the forecast processing section 13, the forecast result evaluation section 111 compares the true data with the forecast data. If prediction errors are too large, the forecast result evaluation section 111 alters the parameters set in the forecast processing data configuring section 12 and/or the forecast processing section 13. The parameter altered by the forecast result evaluation section 111 may be the time period Ls of the historical data for evaluation 32, the time period Lf of the forecast data 23, or the time period Li from which the historical data 34 are taken, which are set in the forecast processing data configuring section 12 as shown in FIGS. 2, 3A and 3B, or the rank of the data matrix 42 (M) (i.e., the number of rows or columns of the square matrix 53 (S)) at the time of singular value decomposition set in the forecast processing section 13 as shown in FIG. 5, for example. Since the prediction errors are reduced in this structure of the third embodiment, it is possible to further increase the accuracy of the output forecast data 23.

Fourth Embodiment

Figure 12:
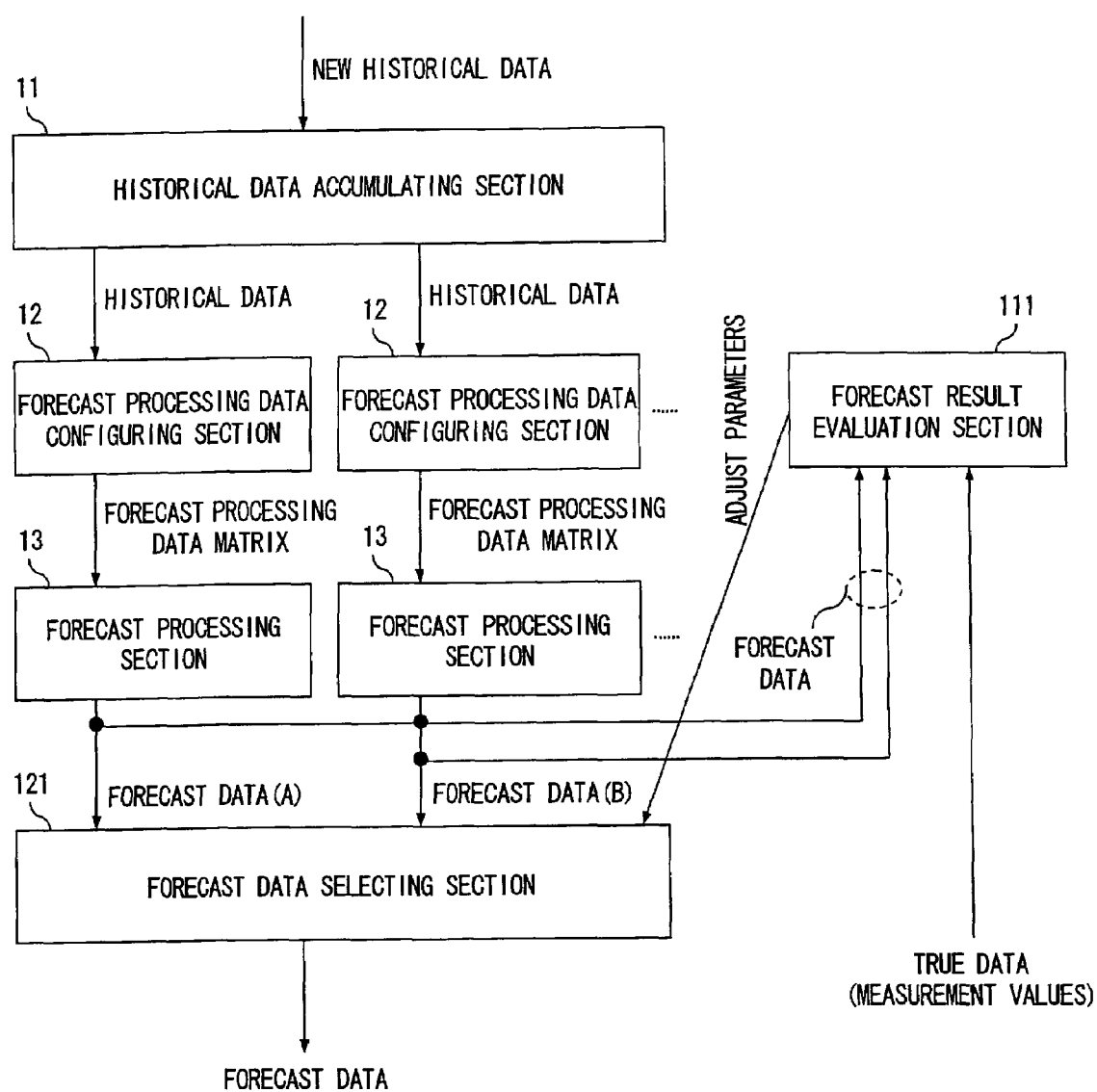
FIG. 12 is a block diagram showing the structure of a forecasting apparatus according to a fourth embodiment of the invention.

FIG. 12 is a block diagram showing the structure of a forecasting apparatus according to a fourth embodiment of the present invention, in which elements corresponding to those of the first embodiment shown in FIG. 1 are designated by the same reference numerals.

What is characteristic of the fourth embodiment is that the forecasting apparatus includes a plurality of parallel-arranged forecast processing data configuring sections 12 and forecast processing sections 13. The aforementioned parameters, such as the time period Ls of the historical data for evaluation 32, the time period Lf of the forecast data 33, and the time period Li from which the historical data 34 are taken, are set in each of the forecast processing data configuring sections 12. These parameters are set to different values in the individual forecast processing data configuring sections 12. Also, the parameter set in each of the forecast processing sections 13, that is, the rank of the data matrix 42 (M) (i.e., the number of rows or columns of the square matrix 53 (S)) at the time of singular value decomposition shown in FIG. 5 is set to different values in the individual forecast processing sections 13. The forecasting apparatus of the fourth embodiment also includes a forecast result evaluation section 111 like the one shown in the third embodiment.

In the forecasting apparatus of the fourth embodiment thus structured, the parallel-arranged forecast processing data configuring sections 12 and forecast processing sections 13 perform mathematical operation for calculating the forecast data 23 in parallel. A forecast data selecting section 121 calculates and outputs the weighted mean of the forecast data 23 output in parallel from the individual forecast processing sections 13. The forecast result evaluation section 111 compares true data obtained from actual measurement values with the forecast data 23 output from each forecast processing section 13. If prediction errors are too large, the forecast result evaluation section 111 alters a parameter used for weighting the forecast data 23 output from the individual forecast processing sections 13.

Referring to FIG. 12, the forecast data output from the left-hand forecast processing section 13 is designated "A" and the forecast data output from the right-hand forecast processing section 13 is designated "B". If the forecast result evaluation section 111 judges that the prediction error is too large when the forecast data selecting section 121 outputs Axk1+Bx(1−k1) at first (where k1 is a weighting coefficient; k1≦1), the forecast result evaluation section 111 alters the value of the weighting coefficient from k1 to k2. As a result, the forecast data selecting section 121 outputs Axk2+Bx(1−k2) and the prediction error decreases, so that the structure of the fourth embodiment further increases the accuracy of the output forecast data 23.

While the forecast result evaluation section 111 alters the value of the weighting coefficient in the fourth embodiment described above, the embodiment may be modified such that the forecast data selecting section 121 selects one of the outputs of the individual forecast processing sections 13 instead of altering the value of the weighting coefficient by the forecast result evaluation section 111.

Fifth Embodiment

Figure 13:
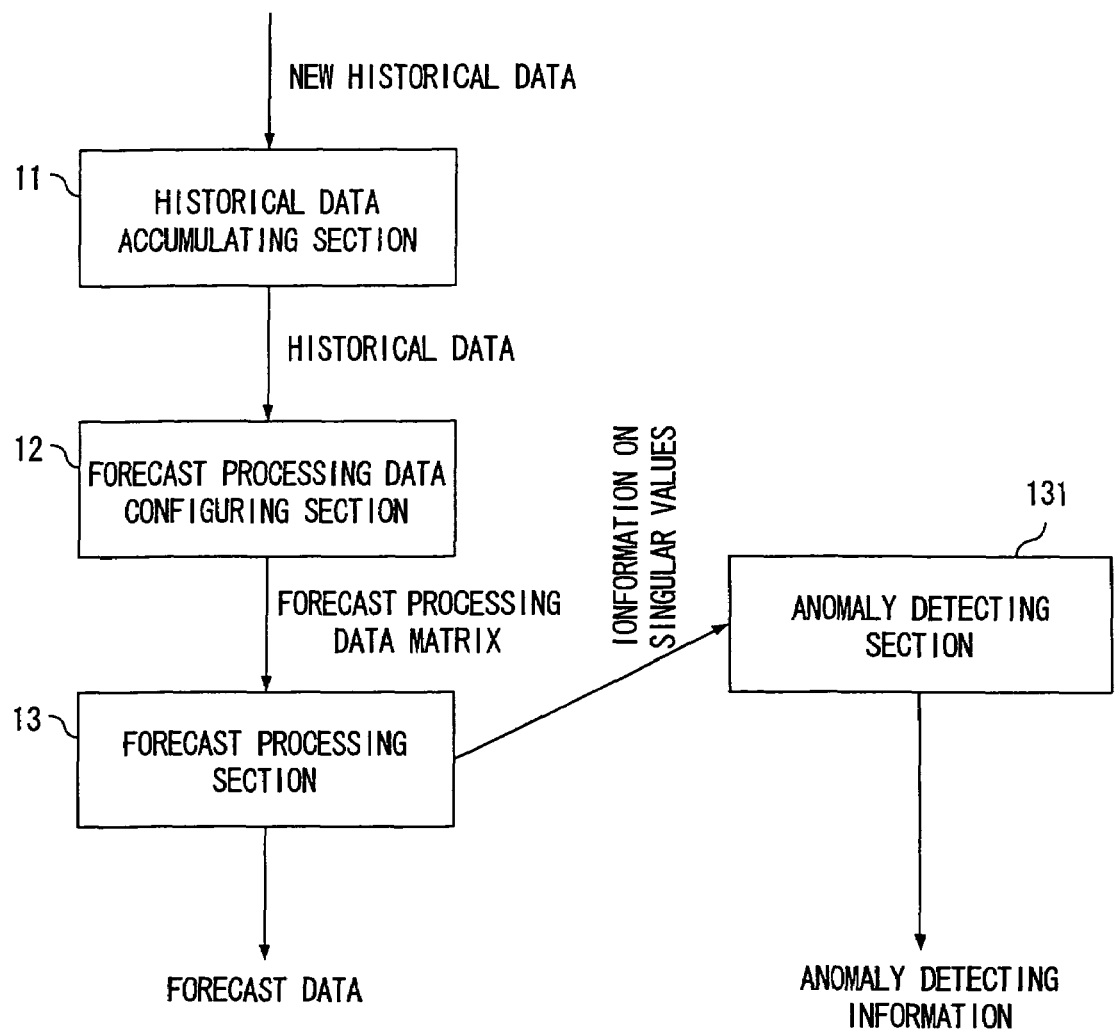
FIG. 13 is a block diagram showing the structure of a forecasting apparatus according to a fifth embodiment of the invention.

FIG. 13 is a block diagram showing the structure of a forecasting apparatus according to a fifth embodiment of the invention, in which elements corresponding to those of the first embodiment shown in FIG. 1 are designated by the same reference numerals.

What is characteristic of the fifth embodiment is that the forecasting apparatus further includes an anomaly detecting section 131 for monitoring the rank of the matrix 53 (Msvd) (i.e., the number of rows or columns of the square matrix 53 (S)) obtained by performing singular value decomposition of a matrix which is obtained by adding the forecast data 23 calculated by the forecast operation to the data matrix 42 (M) (or the forecast processing historical data matrix 41) containing only the historical data in the forecast processing section 13 shown in the first embodiment.

If the anomaly detecting section 131 detects that the rank of the matrix 53 (Msvd) (i.e., the number of rows or columns of the square matrix 53 (S)) has increased upon execution of a singular value decomposition from the result of a preceding singular value decomposition, it is recognized that a historical data pattern which has not been observed in the past has been observed. If the anomaly detecting section 131 detects an increase in the rank of the matrix 53 (Msvd), it is judged that something unusual has occurred. In this case, the anomaly detecting section 131 annunciates the occurrence of an unusual situation by transmitting anomaly detecting information to the exterior. The forecasting apparatus of the present embodiment enables on-line detection of anomalies occurring in a control system, for instance. The forecasting apparatus of the embodiment also enables on-line detection of unforeseen incidents occurring in a road traffic system, such as traffic accidents.

While the anomaly detecting section 131 monitors the rank of the matrix 53 (Msvd) obtained by performing singular value decomposition of the matrix which is obtained by adding the forecast data 23 calculated by the forecast operation to the data matrix 42 (M) in the fifth embodiment described above, the embodiment may be modified such that the anomaly detecting section 131 monitors the rank of a matrix obtained by performing singular value decomposition of a matrix which is obtained by adding true data to the data matrix 42 (M) after the true data have been obtained from actual measurement values corresponding to forecast data output from the forecast processing section 13.

Sixth Embodiment

Figure 14:
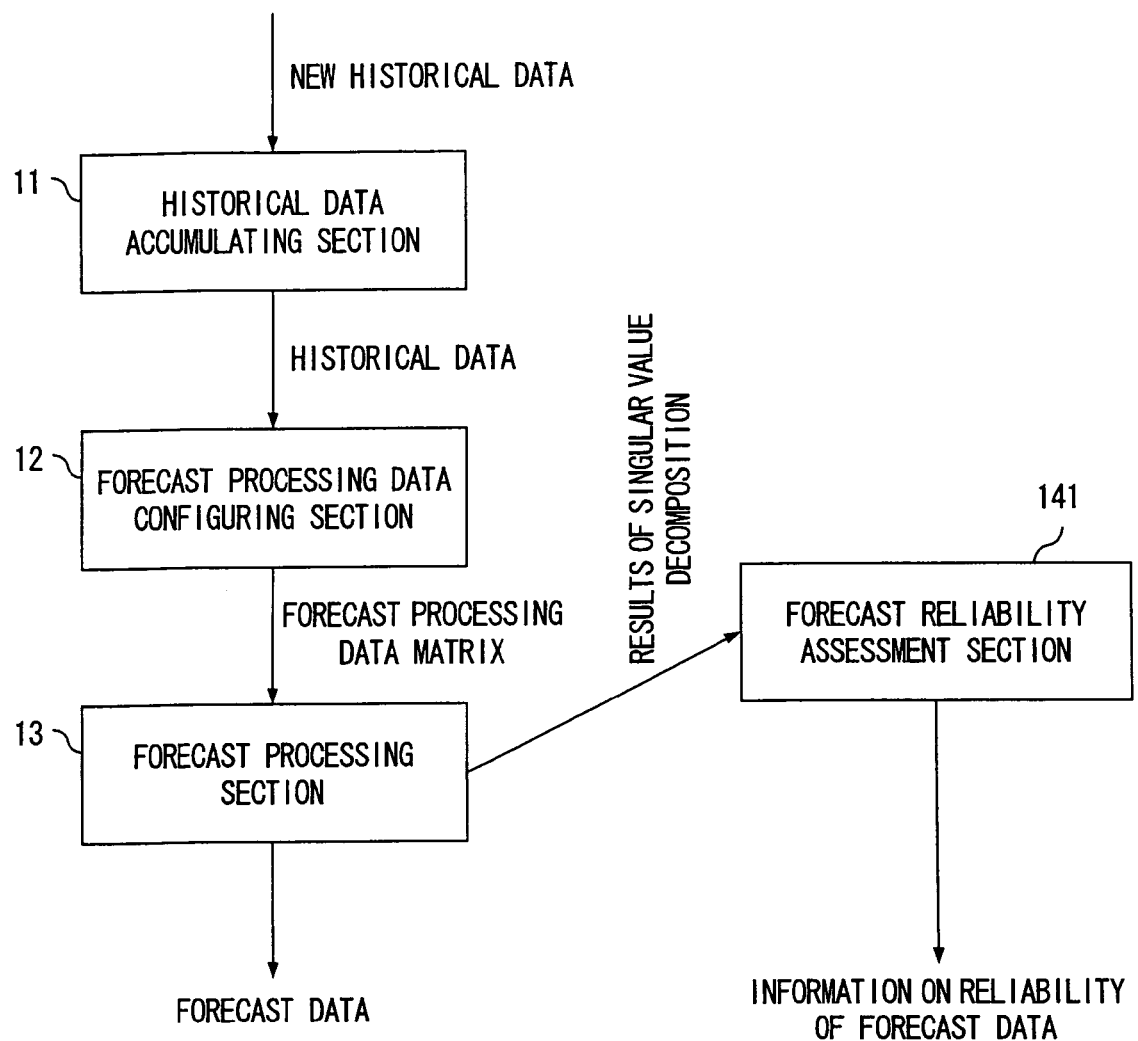
FIG. 14 is a block diagram showing the structure of a forecasting apparatus according to a sixth embodiment of the invention.
Figure 15A:
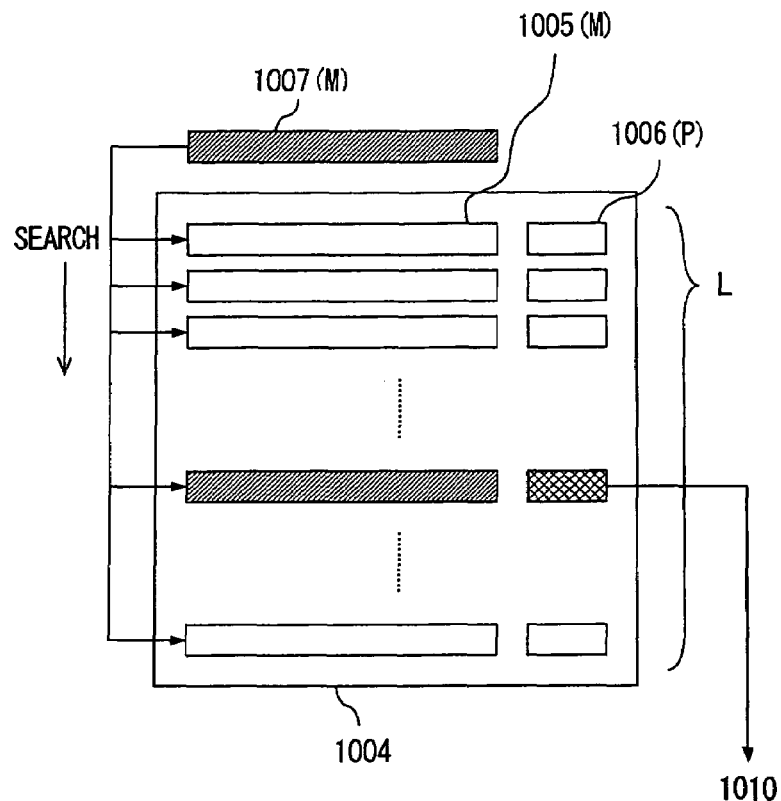
FIGS. 15A and 15B are diagrams illustrating a conventional forecasting method based on a pattern matching technique.
Figure 15B:
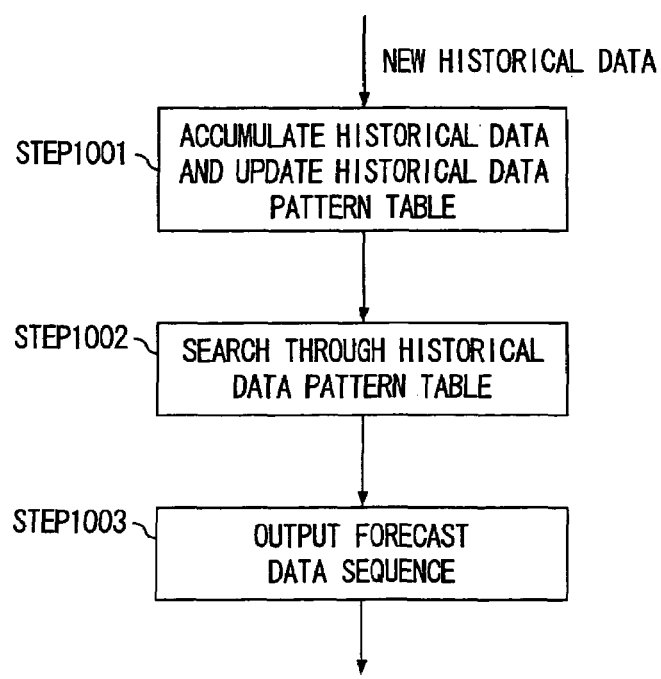

FIG. 14 is a block diagram showing the structure of a forecasting apparatus according to a sixth embodiment of the invention, in which elements corresponding to those of the first embodiment shown in FIG. 1 are designated by the same reference numerals.

What is characteristic of the sixth embodiment as compared to the structure of first embodiment is that the forecasting apparatus further includes a forecast reliability assessment section 141 for assessing the reliability of the forecast data 23 by using three matrices U, S, V (refer to the aforementioned equation (1)) obtained by the singular value decomposition performed by the forecast processing section 13.

Specifically, the forecast reliability assessment section 141 evaluates the likelihood that components of a conventional historical data pattern are included in a matrix obtained by adding the forecast data 23 calculated by the forecast operation to the data matrix 43 including forecast data (or the probability of occurrence of a historical data pattern that previously occurred) by using the three matrices U, S, V obtained by performing singular value decomposition of a matrix which is obtained by adding the forecast data 23 calculated by the forecast operation to the forecast processing historical data matrix 41 in the forecast processing section 13 shown in the first embodiment. The forecast reliability assessment section 141 then estimates the reliability of the forecast data 23 by using the probability of occurrence of the previous historical data pattern thus estimated.

The forecast reliability assessment section 141 examines components of a matrix which holds features of individual historical data in a compressed form, the matrix being taken from among the three matrices U, S, V obtained by performing the singular value decomposition of the aforementioned matrix which is obtained by adding the forecast data 23. The matrix of which components are examined by the forecast reliability assessment section 141 is the matrix V (54), or the product of the matrices S (53) and V (54) in the example of FIG. 5. If this matrix includes n1 number of components which are close to components regarding the forecast data and n2 number of components which are not close to the components regarding the forecast data, the forecast reliability assessment section 141 may output n1/(n1+n2)×100 [%] as the probability of occurrence of the forecast data 23, for example.

If a matrix holding features of historical data obtained as a result of the singular value decomposition in a compressed form in calculating the aforementioned probability of occurrence as discussed above, it is possible to reduce the magnitude of components to be compared, compared to a case where components of original historical data matrices are directly compared. Accordingly, the structure of the sixth embodiment makes it possible to significantly reduce computational complexity.

If the structure of this embodiment is used for predicting travel times in road traffic, for example, the forecast reliability assessment section 141 serves to provide not only projected travel times but also the probability that each of the projected travel times is achieved and the reliability of the same.

While the foregoing discussion of the first to sixth embodiments has illustrated general examples in which the forecast processing data configuring section 12 configures the forecast processing data matrix 41 by using various kinds of data, it is possible to use as historical data not only time series data directly represented by numerical values but also such events as days of the week, time or weather expressed by converted into numerical values reflecting conditions of a subject to be predicted in the present invention.

In predicting real-world phenomena, there are cases where different kinds of data are interrelated, or mutually influenced. Examples of such phenomena include: (1) a situation in which a traffic jam in a downstream road section influences traffic conditions in an upstream road section as would be encountered in predicting traffic jam conditions or travel times; (2) an increase in electricity demand with an increase in the number of air conditioners operated as a result of temperature increase encountered in the electric power industry in predicting the amount of electric power consumption; and (3) a relationship between the stock price of Company A and the stock price of Company B, or between political events and stock prices, encountered in the economic sector in predicting stock prices. The forecasting apparatus of the present invention can predict future events with high accuracy taking into consideration a relationship between different kinds of data if the forecast processing data configuring section 12 configures the forecast processing data matrix 41 by properly selecting such interrelated data.

What is claimed is:

1. A computer implemented forecasting apparatus configured to predict future events by using previously accumulated historical data, said forecasting apparatus comprising:

a forecast processing data configuring section configured to create a data matrix including plural columns of historical data and a column of evaluation historical data and unknown forecast data as missing elements, or plural rows of historical data and a row of evaluation historical data and unknown forecast data as missing elements; and a forecast processing section configured to output values of the missing elements representative of the unknown forecast data by performing singular value decomposition of a subpart of the data matrix, the subpart consisting of the columns, or the rows, of the data matrix containing only historical data, so as to produce a decomposed matrix expressible as a product of base components of the subpart and a square matrix having non-zero singular values, applying said singular value decomposition matrix to said column of evaluation historical data and unknown forecast data to estimate said values of the missing elements, and outputting the forecast data thus estimated.

2. The forecasting apparatus according to claim 1 further comprising a forecast result evaluation section which compares forecast values calculated by the forecast processing section with true values obtained from actual measurements and alters parameters of the forecast processing data configuring section and the forecast processing section in accordance with results of comparison between the forecast values and the true values.

3. The forecasting apparatus according to claim 1, wherein there are provided a plurality of parallel-arranged forecast processing data configuring sections and forecast processing sections of which parameters are set to different values, said forecasting apparatus further comprising a forecast data selecting section for outputting weighted values of the forecast data calculated by the individual forecast processing sections.

4. The forecasting apparatus according to claim 1 further comprising an anomaly detecting section which evaluates the results of the singular value decomposition of the historical data calculated by the forecast processing section and detects an unusual situation if a historical data pattern which has not been observed in the past is observed.

5. The forecasting apparatus according to claim 1 further comprising a forecast reliability assessment section for estimating the reliability of the output forecast data by evaluating the results of the singular value decomposition of the historical data calculated by the forecast processing section.

6. The computer implemented forecasting apparatus according to claim 1, wherein said data matrix contains plural data submatrices,
   each submatrix including plural columns of said historical data and a column of said evaluation historical data and unknown forecast data as missing elements, or plural rows of said historical data and a row of evaluation said historical data and unknown forecast data as missing elements,
   each submatrix comprising consecutive rows, or columns, in said data matrix.

7. The computer implemented forecasting apparatus according to claim 1, further comprising:
   a historical data accumulating section configured to accumulate results of the singular value decomposition of the historical data calculated by the forecast processing section and to output the accumulated results of the singular value decomposition to the forecast processing data configuring section.

8. The computer implemented forecasting apparatus according to claim 1,
   wherein the historical data and unknown forecast data of the data matrix represent movements of individual moving objects,
   the forecast processing data configuring section is configured to create the data matrix indicating traveling route patterns of the individual moving objects passing specific observation points by entering times at which each individual moving object passes the individual observation points, or entering numbers indicating in which order each individual moving object passes the individual observation points, and
   the forecast processing section is configured to output a future traveling route of a particular moving object.

9. The computer implemented forecasting apparatus according to claim 1,
   wherein the historical data and unknown forecast data of the data matrix represent movements of individual moving objects,
   the forecast processing data configuring section is configured to create the data matrix indicating traveling time patterns of individual moving objects by entering travel times of each individual moving object traveling individual road sections, and
   the forecast processing section is configured to output a future traveling time of a particular moving object.

10. The apparatus of claim 1, wherein said forecast data comprises one of:
    traffic related forecast data related to one of roadways, railways, and elevators, and comprising one of travel time, traffic volumes, and traffic jam conditions;
    power consumption forecast data; and
    stock price change forecast data.

11. A computer-readable medium storing a computer program configured to cause a computer device to implement a forecasting method of predicting future events by using previously accumulated historical data, the computer program comprising instructions for:
    creating a data matrix including plural columns of historical data obtained during a first time period having a first predetermined length and a column of evaluation historical data and unknown forecast data as missing elements, or plural rows of historical data and a row of evaluation historical data and unknown forecast data as missing elements, the evaluation historical data being obtained during a second time period having a second predetermined length; and
    outputting values of the missing elements representative of the unknown forecast data by
    performing singular value decomposition of a subpart of the data matrix, the subpart consisting of the columns, or the rows, of the data matrix containing only historical data, so as to produce a decomposed matrix expressible as a product of base components of the subpart and a square matrix having non-zero singular values,
    applying said singular value decomposition matrix to said column, or said row, of evaluation historical data and unknown forecast data to estimate said values of the missing elements, and
    outputting the forecast data thus estimated.

12. The computer program according to claim 11, further comprising instructions for:
    comparing forecast values with subsequently observed true values to obtain a comparison result; and
    altering parameters associated with at least one of said steps of creating a data matrix and outputting values of the missing elements in accordance with said comparison result.

13. The computer program according to claim 11, further comprising instructions for:
    repeating said steps of creating a data matrix and outputting values of the missing elements with at least one parameter different from parameters used in said steps of creating a data matrix and outputting values of the missing elements; wherein
    said repeated step of outputting values of the missing elements includes weighting the forecast data output from said repeated step.

14. The computer program according to claim 11, further comprising instructions for:
    evaluating the results of the singular value decomposition of the historical data calculated; and
    detecting an a historical data pattern which has not previously been observed.

15. The computer program according to claim 11, further comprising instructions for:
    estimating the reliability of the output forecast data by evaluating the results of the singular value decomposition of the historical data.

16. The computer program of claim 11, wherein said data matrix contains plural data submatrices,
    each submatrix including plural columns of said historical data and a column of said evaluation historical data and unknown forecast data as missing elements, or plural rows of said historical data and a row of said evaluation historical data and unknown forecast data as missing elements,
    each submatrix constituting consecutive rows, or columns, in said data matrix.

17. The computer program of claim 11, further comprising instructions for:
    accumulating results of the singular value decomposition of the historical data calculated by the forecast processing section and to output the accumulated results of the singular value decomposition to the forecast processing data configuring section.

18. The computer program of claim 11,
    wherein the historical data and unknown forecast data of the data matrix represent movements of individual moving objects, the data matrix includes data indicating traveling route patterns of the individual moving objects passing specific observation points by entering times at which each individual moving object passes the individual observation points, or entering numbers indicating in which order each individual moving object passes the individual observation points, and the forecast data includes a future traveling route of a particular moving object.

19. The computer program of claim 11, wherein the historical data and unknown forecast data of the data matrix represent movements of individual moving objects, the data matrix includes data indicating traveling time patterns of individual moving objects by entering travel times needed by each individual moving object to travel individual road sections, and the forecast data includes a future traveling time of a particular moving object.

20. The computer program of claim 11, wherein said forecast data comprises one of:

traffic related forecast data related to one of roadways, railways, and elevators, and comprising one of travel time, traffic volumes, and traffic jam conditions;

power consumption forecast data; and stock price change forecast data.

* * * * *